United States Patent [19]

Stein

[11] Patent Number: 4,932,559
[45] Date of Patent: Jun. 12, 1990

[54] DISPENSER FOR FUNGIBLE GOODS

[75] Inventor: Roger P. Stein, Chelsea, Mich.

[73] Assignee: Feed-Rite, Inc., Chelsea, Mich.

[21] Appl. No.: 261,378

[22] Filed: Oct. 24, 1988

Related U.S. Application Data

[63] Continuation-in-part of Ser. No. 67,205, Jun. 29, 1987, Pat. No. 4,809,880.

[51] Int. Cl.$^5$ .............................................. G07F 11/00
[52] U.S. Cl. ........................................ 221/7; 221/186;
221/200; 198/752; 198/763; 377/6
[58] Field of Search ............... 221/7, 200, 186; 377/6;
453/55, 32; 198/752, 763; 193/2 A

[56] References Cited

U.S. PATENT DOCUMENTS

| | | | |
|---|---|---|---|
| 3,730,386 | 5/1973 | Monsees | 221/7 |
| 3,746,211 | 7/1973 | Burgess, Jr. | 453/32 X |
| 3,956,812 | 5/1976 | Kawakami et al. | 193/2 A X |
| 4,809,880 | 3/1989 | Stein | 221/204 |

FOREIGN PATENT DOCUMENTS 1121032 7/1968 United Kingdom ................... 221/7

Primary Examiner—Michael S. Huppert
Assistant Examiner—Gregory L. Huson
Attorney, Agent, or Firm—Barnes, Kisselle, Raisch, Choate, Whittemore & Hulbert

[57] ABSTRACT

A dispenser for fungible articles such as pharmaceutical tablets in which an elongated trough is vibrated at a downwardly oriented horizontal angle to dispense articles is single file alignment. An optical detector is mounted adjacent to the trough discharge end and is coupled to a counter for indicating the number of articles dispensed from the trough. The counter may be preset by an operator to dispense a preselected number of articles. The trough is releasably held to the dispenser cabinet by electromagnets which are energized simultaneously with the vibration motor. A container into which articles are to be dispensed is releasably captured beneath the discharge end of the trough adjacent to the detector.

35 Claims, 2 Drawing Sheets

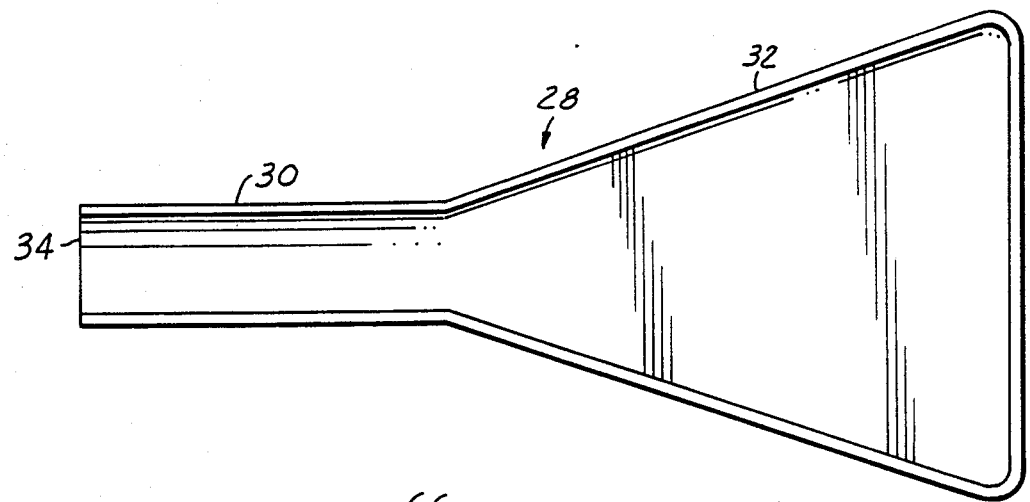
FIG.3
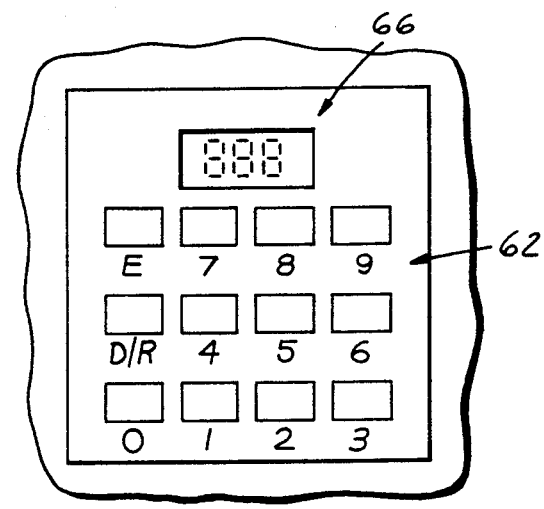
FIG.4
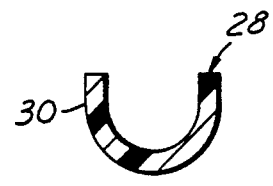
FIG.6
FIG.5
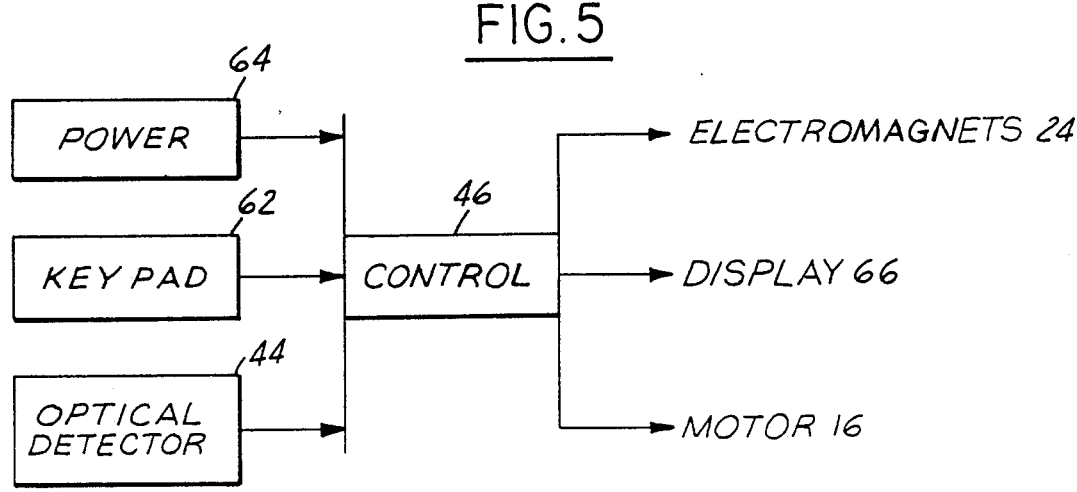

DISPENSER FOR FUNGIBLE GOODS

This application is a continuation-in-part of application Ser. No. 067,205 filed Jun. 29, 1987, now U.S. Pat. No. 4,809,880.

The present invention is directed to apparatus for dispensing small fungible goods such as pharmaceutical tablets.

Parent application Ser. No. 067,205, filed Jun. 29, 1987, discloses dispensing apparatus for fungible goods such as pharmaceutical tablets that comprises an elongated trough having a neck with an arcuate base and a widened pocket spaced from an open discharge end of the neck. The trough is mounted on a base at a slight angle to the horizontal downward toward the discharge end. A motor is carried by the base and coupled to the trough through an eccentric cam arrangement for vibrating the trough in a plane at the horizontal mounting angle such that the discharge end of the trough vibrates at a greater amplitude than the discharge-remote end of the trough. In this way, goods such as pharmaceutical tablets placed in the trough pocket migrate along the neck to the discharge end and assume a single file alignment as they reach the discharge end.

An object of the present invention is to provide dispensing apparatus of the described character that includes facility for removably positioning a container beneath the discharge end of the trough for receiving articles exiting the trough, that includes facility for counting articles discharged from the trough, and/or that provides a mechanism for easily and rapidly removably mounting the trough to the vibrating mechanism. A further and yet more specific object is to provide dispensing apparatus of the described character that includes facility for dispensing a preselected number of fungible articles such as tablets into a container removably carried by the apparatus.

The invention, together with additional objects, features and advantages thereof, will be best understood from the following description, the appended claims and the accompanying drawings in which:

FIG. 3 is a top plan view of the dispenser trough in the apparatus of FIGS. 1 and 2;

FIG. 4 is a fragmentary elevational view showing the keypad and display in the apparatus of FIG. 1 on an enlarged scale;

FIG. 5 is a functional block diagram of the dispenser control electronics; and

FIG. 6 is a sectional view taken substantially along the line 6—6 in FIG. 1.

Figure 1:
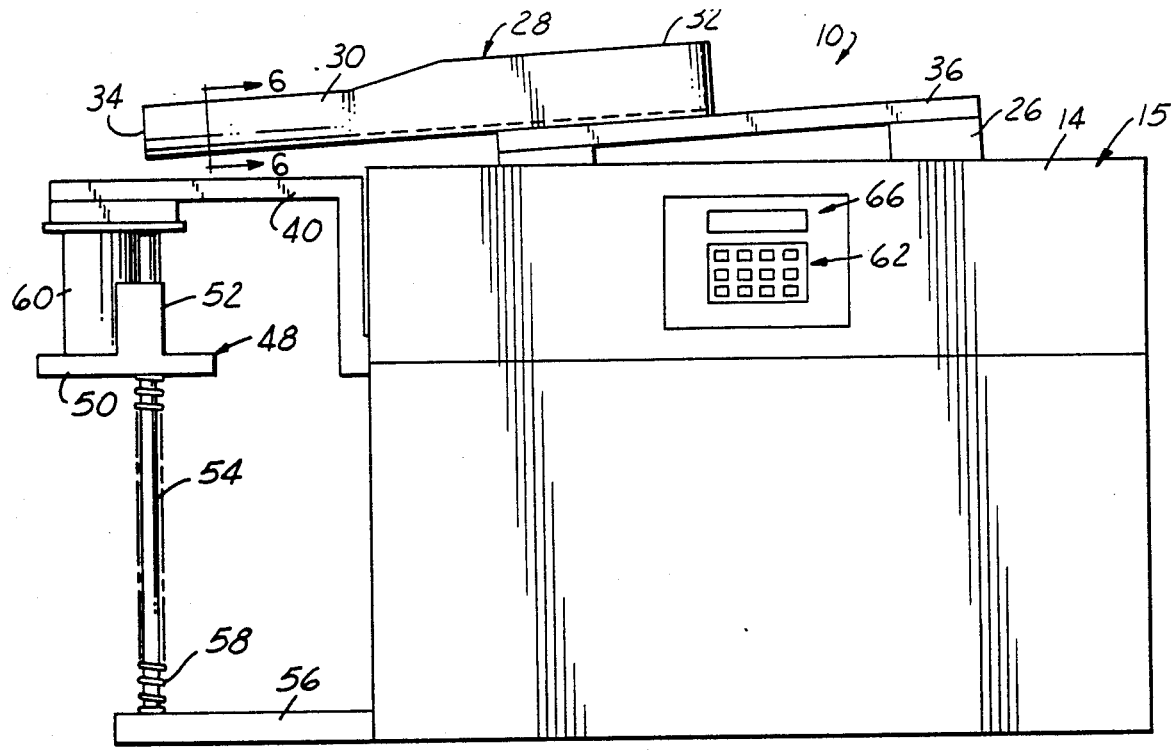
FIG. 1 is a front elevational view of a dispenser for fungible goods such as pharmaceutical tablets in accordance with a presently preferred embodiment of the invention.

The disclosure of U.S. Pat. No. 4,809,880 is incorporated herein by reference.

The drawings illustrate a dispenser 10 in accordance with a presently preferred embodiment of the invention as comprising a base 12 having an enclosure 14 mounted thereon to form an enclosed cabinet 15. An electric motor 16 is mounted within cabinet 15 and has a shaft coupled by an eccentric 18 to a plate 20. Plate 20 is pivotally mounted at its eccentric-remote end to a stanchion 22 affixed to base 12 at a position spaced from motor 16 and parallel to the axis thereof. A pair of electromagnets 24 are mounted within associated insulating bodies 26 on the upper surface of plate 20 at longitudinally spaced positions between motor 16 and stanchion 22.

A trough 28 comprises a one-piece member of molded plastic construction or the like having an elongated neck 30 of uniform substantially semi-circular cross section throughout its length, as best seen in FIG. 6. An enlarged triangularly-shaped part-receiving pocket 32 is formed integrally with neck 30 at one end thereof, and the opposing end 34 of neck 30 is open for discharge of parts from the trough. It will be noted in FIG. 3 that trough 28 is of symmetrical construction along its central axis that bisects neck 30 and pocket 32. Trough 28 has an extended base 36 (FIGS. 1 and 2) with sections 38 of magnetically permeable material affixed at longitudinally spaced positions to the underside thereof for registery with electromagnets 24 carried by plate 20. It will be noted in FIG. 2 that sections 38 and bodies 26 are tapered for enhanced interfitting engagement.

A bracket 40 is affixed to base 12 and extends from cabinet 14 beneath open discharge end 34 of trough 28 when trough 28 is mounted on plate 20. Bracket 40 has a tapered opening 42, positioned immediately beneath trough discharge end 34 for receiving articles discharged from the trough. An optical sensor 44 is positioned beneath bracket 40 in radial alignment with opening 42 for sensing passage of articles through opening 42, and for providing corresponding electrical signals to the device control electronics (FIG. 5). A platform 48 has a flat base 50 and a central boss 52 with through-passages slidably received over a pair of vertical guide rods or posts 54. Posts 54 extend from bracket 40 adjacent to opening 42 to a ledge 56 that projects outwardly from base 12. A pair of coil springs 58 are respectively received over guideposts 54, and are captured in compression between platform base 50 and ledge 56 so as to urge platform 48 resiliently upwardly toward bracket 40 beneath opening 42, with boss 52 functioning as a stop to limit upward motion of platform 48. A container 60 is removably clamped by platform 48 beneath bracket 40 in alignment with opening 42 for receiving articles discharged from trough 28. It will be appreciated, of course, that dispenser 10 is adapted to receive containers 60 of a wide range of geometries and sizes, the specific dispenser 60 illustrated in FIGS. 1 and 2 being by way of example only.

Dispenser control electronics (FIG. 5) comprises a controller 46, which preferably takes the form of a microprocessor-based controller. Inputs to controller 46 are received from optical detector 44 as previously described, from a keypad 62 mounted on the sloping upper front panel of cabinet 15 as illustrated in FIG. 1, and from a switch suitably located on the cabinet for applying electrical power 64 to the controller. Controller outputs are fed to motor 16, to an alphanumeric display 66 carried immediately adjacent to keypad 62, and to electromagnets 24 mounted on plate 20. As best seen in FIG. 4, keypad 62 includes keys associated with numerals "0" through "9", as well as control keys designated "E" and "D/R". Display 66 preferably comprises a digital alphanumeric display, as shown in FIG. 4.

Figure 2:
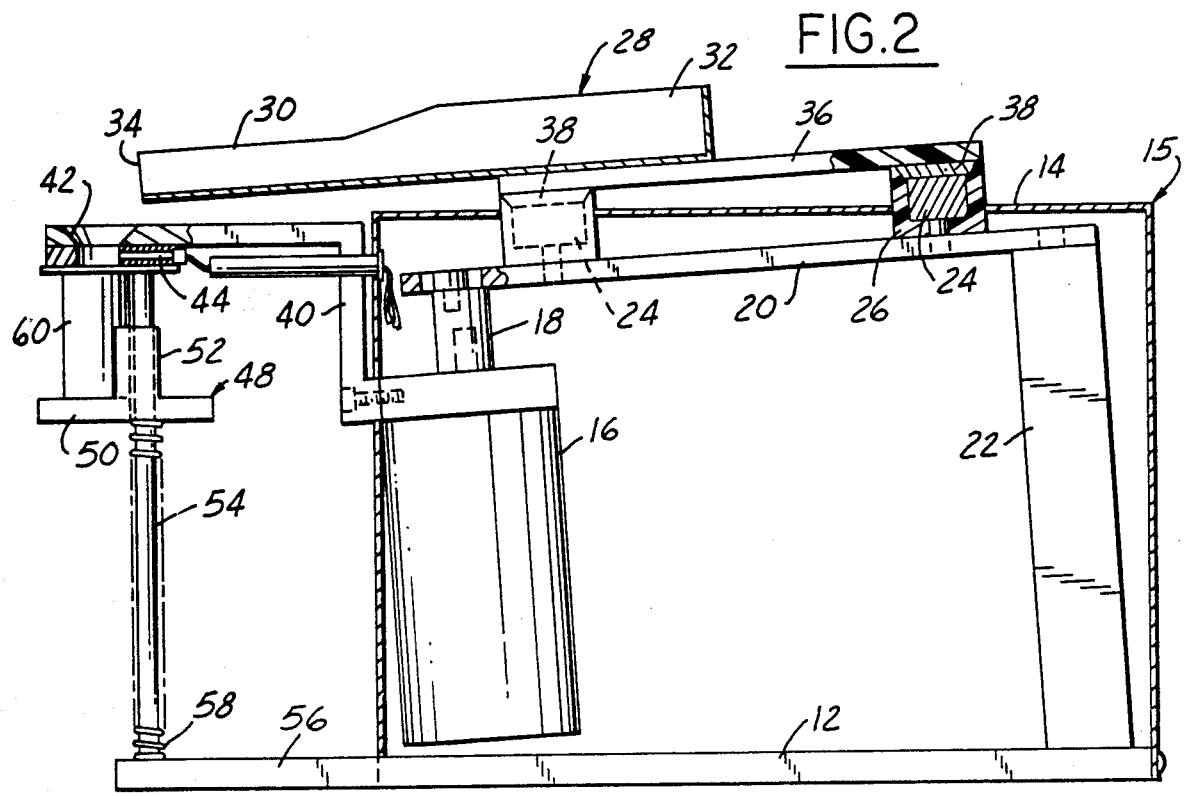
FIG. 2 is a sectioned front elevational view of the apparatus shown in FIG. 1.

In the preferred embodiment of the invention, controller 46 includes facility for receiving and storing a preselected number of articles to be dispensed, entered by an operator through depression of appropriate numeric keys on keypad 62 and then depression of the "E"

button to enter or load the number into the controller. Depression of the "D/R" control key then energizes controller 46 to apply power to motor 16, and simultaneously to energize electromagnets 24 so as to clamp trough 28 firmly in position. Motor 16 functions through eccentric 18 to vibrate plate 20, and hence to vibrate trough 28 electromagnetically clamped to plate 20. Plate 20 and trough 28 are oriented at parallel horizontal angles, as best seen in FIG. 2, sloping downwardly toward discharge end 34 of trough 28. Articles contained within pocket 32 of trough 28 migrate through neck 30, and at the same time orient themselves in single file alignment prior to discharge from end 34 through opening 42 into container 60.

In accordance with one aspect of the present invention, radius of curvature of the base of neck 30 is coordinated with diameter of articles to be discharged such that automatic single-file alignment takes place as described. Angular velocity of neck 30, with respect to the axis of vibration at stanchion 22, increases as the articles migrate down the chute from pocket 32 to discharge end 34. Such increasing angular velocity causes the articles to roll or slide up the trough sidewalls, while at the same time encouraging increased spacing between the articles lengthwise of the trough. If the radius of curvature of the trough is too small with respect to article size, the articles will not be able to roll or slide up the trough sidewalls sufficiently to assume single file alignment. If the radius is too large, articles become too closely bunched to assume single file alignment. It has been found that a one-inch diameter trough (one-half inch radius) works well for all standard-size pharmaceutical tablets.

Articles discharged from trough 28 are counted by detector 44 and controller 46, with controller 46 containing a count that is initially preset with the desired article count and thereafter being decremented by each signal from detector 44 indicating passage of an article. The decrementing count is indicated at display 66 so that the operator can visually perceive operation of the dispenser. When the count reaches zero, indicating that the number of articles dispensed into container 60 equals the number preset by the operator, controller 46 de-energizes motor 16 and electromagnets 24. Container 60 may then be removed by the operator, and a new container positioned within the dispenser. If the same number of articles is to be dispensed into the new container, the operator need merely press the "D/R" control key on keypad 62, whereupon the previously-set number is again indicated at display 66 and loaded into the counter of controller 46, and operation proceeds as previously noted. On the other hand, the programmed number may be changed at will be merely "over writing" the displayed number. If the operator wishes merely to count the number of articles in inventory, the articles are poured into pocket 32 of trough 28 and a suitable container 60 is positioned beneath opening 62. Controller 46 is set to a count of "000" through keypad 62 and the "D/R" control key is depressed to initiate operation. Controller 46 energizes motor 16 and electromagnets 24, and the counter within controller 46 is incremented by passage of articles adjacent to detector 44, with this operation continuing independently of the counter until the operation is terminated by the operator.

Invention claimed is:

1. A dispenser for fungible goods such as pharmaceutical tablets comprising:

an elongated trough having a neck with an arcuate base and a receiving portion spaced from an open discharge end of said neck, means for mounting said trough at a horizontal angle downward toward said discharge end, means for vibrating said trough in a plane at said horizontal angle with said discharge end vibrating at greater amplitude than said receiving portion, such that goods in said receiving portion migrate along said neck to said discharge end and assume single file alignment as they reach said discharge end, means affixed to said mounting means and having an opening positioned beneath said discharge end, a platform beneath said opening, a pair of spaced guide posts having said platform slidably mounted thereon, and a pair of coil springs respectively surrounding said guide posts and captured in compression between said platform and said mounting means resiliently urging said platform toward said opening removably to clamp a container beneath said opening between said platform and said opening-having means.

2. The dispenser set forth in claim 1 wherein said mounting means comprises electromagnetic means including an electromagnet carried by said mounting means and means of magnetically permeable construction carried by said trough for releasably holding said trough on said mounting means.

3. The dispenser set forth in claim 2 wherein said electromagnetic means comprises a pair of electromagnets carried by said mounting means and spaced lengthwise of said trough, a pair of magnetic means carried by said trough for registry with said electromagnets, and means for selectively energizing said electromagnets.

4. The dispenser set forth in claim 3 wherein said selectively-energizing means is coupled to said vibrating means for energization simultaneously.

5. The dispenser set forth in claim 1 further comprising means positioned adjacent to said open end for counting goods exiting said open end, and means for displaying number of goods exiting said open end past said counting means.

6. The dispenser set forth in claim 5 wherein said counting means comprises a sensor on said mounting means adjacent to said opening for providing an electrical signal responsive to passage of each of said fungible goods, and a counter responsive to said electrical signals for accumulating a count of goods passing said sensor.

7. The dispenser set forth in claim 6 wherein said sensor comprises an optical sensor.

8. The dispenser set forth in claim 6 wherein said number-displaying means comprises an alphanumeric digital display.

9. The dispenser set forth in claim 6 wherein said counting means further comprises means for entering a desired number of goods to be dispensed into a container, and means coupled to said vibrating means for terminating vibration of said trough when said accumulated count equals said desired number.

10. The dispenser set forth in claim 9 wherein said entering means includes means for selectively changing said desired number.

11. The dispenser set forth in claim 10 wherein said entering means further includes means for operating said vibrating means independently of said counting means.

12. The dispenser set forth in claim 11 wherein said entering means comprises an alphanumeric keypad.

13. A dispenser for fungible goods such as pharmaceutical tablets comprising:
   an elongated trough having a neck with an arcuate base and a receiving portion spaced from an open discharge end of said neck,
   means for mounting said trough at a horizontal angle downward toward said discharge end,
   means for vibrating said trough in a plane at said horizontal angle with said discharge end vibrating at greater amplitude than said receiving portion, such that goods in said receiving portion migrate along said neck to said discharge end and assume single file alignment as they reach said discharge end, and
   means carried by said mounting means and by said trough for releasably holding said trough on said mounting means, said releasably-holding means comprising first means carried by said trough and second means carried by said trough-mounting at a position adjacent to said first means when said trough is disposed on said mounting means, said first and second means being of magnetic construction for attraction to each other to hold said trough and said first means on said mounting means.

14. The dispenser set forth in claim 13 wherein said releasably-holding means comprises a pair of electromagnets carried by said mounting means and spaced lengthwise of said trough, a pair of magnetic means carried by said trough for registry with said electromagnets, and means for selectively energizing said electromagnets.

15. The dispenser set forth in claim 13 further comprising means positioned adjacent to said open end for counting goods exiting said open end, and means for displaying number of goods exiting said open end past said counting means.

16. The dispenser set forth in claim 13 wherein said second means comprises an electromagnet carried by said mounting means, wherein said first means comprises means of magnetically permeable construction carried by said trough for registry with said electromagnet, and wherein said dispenser further comprises means for selectively energizing said electromagnet.

17. The dispenser set forth in claim 16 wherein said selectively-energizing means is coupled to said vibrating means for energization simultaneously.

18. The dispenser set forth in claim 13 further comprising means affixed to said mounting means and having an opening positioned beneath said discharge end, a platform mounted beneath said opening, and means resiliently urging said platform toward said opening removably to clamp a container beneath said opening between said platform and said opening-having means.

19. The dispenser set forth in claim 18 wherein said resiliently-urging means comprises guide means having said platform slidably mounted thereon, and spring means carried by said guide means.

20. The dispenser set forth in claim 18 wherein said resiliently-urging means comprises a pair of spaced guide posts having said platform slidably mounted thereon, and a pair of coil springs respectively surrounding said guide posts and captured in compression between said platform and said mounting means.

21. The dispenser set forth in claim 13 wherein said counting means comprises a sensor on said mounting means adjacent to said open end for providing an electrical signal responsive to passage of each of said fungible goods, and a counter responsive to said electrical signals for accumulating a count of goods passing said sensor.

22. The dispenser set forth in claim 21 wherein said counting means further comprises means for entering a desired number of goods to be dispensed, and means coupled to said vibrating means for terminating vibration of said trough when said accumulated count equals said desired number.

23. The dispenser set forth in claim 22 wherein said display means comprises an alphanumeric display and said entering means comprises an alphanumeric keypad.

24. A dispenser for fungible goods such as pharmaceutical tablets comprising:
   an elongated trough having a neck with an arcuate base and a receiving portion spaced from an open discharge end of said neck,
   means for mounting said trough at a horizontal angle downward toward said discharge end,
   means for vibrating said trough in a plane at said horizontal angle with said discharge end vibrating at greater amplitude than said receiving portion, such that goods in said receiving portion migrate along said neck to said discharge end and assume single file alignment as they reach said discharge end,
   means affixed to said mounting means and having an opening positioned beneath said discharge end, a platform beneath said opening, a pair of spaced guide posts having said platform slidably mounted thereon, and a pair of coil springs respectively surrounding said guide posts and captured in compression between said platform and said mounting means resiliently urging said platform toward said opening removably to clamp a container beneath said opening between said platform and said opening-having means, and
   an electromagnet carried by said mounting means, means of magnetically permeable construction carried by said trough at a position adjacent to said electromagnet when said trough is mounted on said mounting means, and means for selectively energizing said electromagnet for releasably holding said trough on said mounting means.

25. The dispenser set forth in claim 24 wherein said selectively-energizing means is coupled to said vibrating means for energization simultaneously.

26. The dispenser set forth in claim 25 further comprising counting means including a sensor on said mounting means adjacent to said open end for providing an electrical signal responsive to passage of each of said fungible goods, and a counter responsive to said electrical signals for accumulating a count of goods passing said sensor.

27. The dispenser set forth in claim 26 further comprising means coupled to said counter for displaying number of goods exiting said open end.

28. The dispenser set forth in claim 27 wherein said number-displaying means comprises an alphanumeric digital display.

29. The dispenser set forth in claim 26 wherein said counting means further comprising means for entering a desired number of goods to be dispensed, and means coupled to said vibrating means for terminating vibration of said trough when said accumulated count equals said desired number.

30. The dispenser set forth in claim 29 wherein said entering means includes means for selectively changing said desired number.

31. The dispenser set forth in claim 29 wherein said entering means further includes means for operating said vibrating means independently of said counting means.

32. The dispenser set forth in claim 29 wherein said entering means comprises an alphanumeric keypad.

33. A dispenser for fungible goods such as pharmaceutical tablets comprising:

an elongated trough having a neck with an arcuate base and a receiving portion spaced from an open discharge end of said neck, means for mounting said trough at a horizontal angle downward toward said discharge end, means for vibrating said trough in a plane at said horizontal angle with said discharge end vibrating at greater amplitude than said receiving portion, such that goods in said receiving portion migrate along said neck to said discharge end and assume single file alignment as they reach said discharge end, means affixed to said mounting means beneath said discharge end for removably positioning a container beneath said discharge end to receive goods exiting said discharge end, and means positioned adjacent to said open end for counting goods exiting said open end, and means for displaying number of goods exiting said open end past said counting means, said counting means comprising a sensor on said mounting means adjacent to said opening for providing an electrical signal responsive to passage of each of said fungible goods, a counter responsive to said electrical signals for accumulating a count of goods passing said sensor, an alphanumeric keypad for entering and selectively changing a desired number of goods to be dispensed into a container, means coupled to said vibrating means for terminating vibration of said trough when said accumulated count equals said desired number, and means for operating said vibrating means independently of said counting means.

34. The dispenser set forth in claim 33 wherein said sensor comprises an optical sensor.

35. The dispenser set forth in claim 33 wherein said mounting means comprises electromagnetic means carried by said mounting means and by said trough for releasably holding said trough on said mounting means.

* * * * *

UNITED STATES PATENT AND TRADEMARK OFFICE
CERTIFICATE OF CORRECTION

PATENT NO. : 4,932,559

DATED : June 12, 1990

INVENTOR(S) : Roger P. Stein

It is certified that error appears in the above—identified patent and that said Letters Patent is hereby corrected as shown below:

Title page, item [75]:

Please add the name of "Dennis E. Boos" as a joint inventor.

Signed and Sealed this

Twentieth Day of August, 1991

*Attest:*

HARRY F. MANBECK, JR.

*Attesting Officer*  *Commissioner of Patents and Trademarks*